United States Patent
Enomoto et al.

(10) Patent No.: US 12,297,143 B2
(45) Date of Patent: May 13, 2025

(54) COATING CONDITION DETECTION METHOD, COATING CONDITION DETECTION DEVICE, AND OPTICAL FIBER MANUFACTURING METHOD

(71) Applicant: SUMITOMO ELECTRIC INDUSTRIES, LTD., Osaka (JP)

(72) Inventors: Tadashi Enomoto, Osaka (JP); Takahiro Saito, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 357 days.

(21) Appl. No.: 17/795,361

(22) PCT Filed: Jan. 29, 2021

(86) PCT No.: PCT/JP2021/003337
§ 371 (c)(1),
(2) Date: Jul. 26, 2022

(87) PCT Pub. No.: WO2021/153765
PCT Pub. Date: Aug. 5, 2021

(65) Prior Publication Data
US 2023/0150870 A1    May 18, 2023

(30) Foreign Application Priority Data
Jan. 30, 2020   (JP) ................................ 2020-013921

(51) Int. Cl.
*C03C 25/12*        (2006.01)
*C03C 25/105*       (2018.01)
*G01N 21/952*       (2006.01)

(52) U.S. Cl.
CPC ............ *C03C 25/12* (2013.01); *C03C 25/105* (2013.01); *G01N 21/952* (2013.01); *G01N 2201/0636* (2013.01); *G01N 2201/08* (2013.01)

(58) Field of Classification Search
CPC .... C03C 25/12; C03C 25/105; G01N 21/952; G01N 2201/0636
See application file for complete search history.

(56) References Cited

U.S. PATENT DOCUMENTS 4,973,343 A * 11/1990 Frazee, Jr. ........... G01B 11/105
                                                    356/73.1
5,151,966 A    9/1992 Brehm et al.
(Continued)

FOREIGN PATENT DOCUMENTS

JP      H03-016938 A     1/1991
JP      H4-313705 A     11/1992
(Continued)

*Primary Examiner* — Nathan T Leong
(74) *Attorney, Agent, or Firm* — Faegre Drinker Biddle & Reath LLP

(57) ABSTRACT

This coating condition detection method according to one embodiment uses a simple device structure to detect the coating condition of a resin layer of a coated fiber. Under the coating condition detection method, an imaging optical system including a reflection mirror having a guide hole through which the optical fiber passes is prepared, and the imaging optical system is disposed so as to cause an object plane conjugate with an imaging plane to intersect the optical fiber that has passed through the reflection mirror and forms an image of light released from the optical fiber on the imaging plane to detect intensity of light at each point on the imaging plane with the intensity of light associated with information on a corresponding position on the object plane.

5 Claims, 7 Drawing Sheets

(56) References Cited

U.S. PATENT DOCUMENTS 5,289,265 A     2/1994   Inoue et al.
2017/0134099 A1*   5/2017   Hara .................. H04J 14/0307

FOREIGN PATENT DOCUMENTS

| JP | H4-315939 A | 11/1992 |
| JP | H4-319642 A | 11/1992 |
| JP | H05-087681 A | 4/1993 |
| JP | H5-107046 A | 4/1993 |
| JP | H08-091878 A | 4/1996 |
| JP | 2005-162524 A | 6/2005 |
| WO | WO2005054145 | * 6/2005 |

* cited by examiner

COATING CONDITION DETECTION METHOD, COATING CONDITION DETECTION DEVICE, AND OPTICAL FIBER MANUFACTURING METHOD

TECHNICAL FIELD

The present disclosure relates to a coating condition detection method, a coating condition detection device, and an optical fiber manufacturing method.

This application claims the priority of Japanese Patent Application No. 2020-013921 filed on Jan. 30, 2020, which is incorporated herein by reference in its entirety.

BACKGROUND ART

As a method for measuring a degree of eccentricity of a coated fiber obtained as a result of coating a glass fiber (bared fiber) with resin during preform drawing, Patent Documents 1 to 4 disclose an optical fiber eccentricity measurement device and measurement method for causing a laser light source to emit a laser beam to a side surface of the coated fiber to detect a grayscale image formed by forward scattered light (transmitted light) of the laser beam, and measuring a degree of eccentricity of the glass fiber in the coated fiber on the basis of a degree of unevenness in thickness of a resin layer.

CITATION LIST

Patent Literature

Patent Document 1: Japanese Patent Application Laid-Open No. H4-315939
Patent Document 2: Japanese Patent Application Laid-Open No. H4-319642
Patent Document 3: Japanese Patent Application Laid-Open No. H5-107046
Patent Document 4: Japanese Patent Application Laid-Open No. H5-087681

SUMMARY OF INVENTION

A coating condition detection method according to an embodiment of the present disclosure is a method for detecting a coating condition of resin with which an optical fiber is coated (coated fiber) in a circumferential direction around a fiber axis using light released from the optical fiber. Under the coating condition detection method according to one aspect, an imaging optical system is prepared, and intensity of light at each point of an image formed by imaging optical system on an imaging plane (light receiving surface) is detected with the intensity of light associated with information on a corresponding position on an object plane. Specifically, the imaging optical system thus prepared includes a reflection mirror disposed on an optical path between the imaging plane and the object plane conjugate with the imaging plane. The reflection mirror has a guide hole through which the coated fiber passes. Further, on the imaging plane side, the imaging optical system is caused to form, on the imaging plane, an image of light released from a portion of the coated fiber that has passed through the guide hole of the reflection mirror, the portion intersecting the object plane, to detect intensity of light at each position on the imaging plane with the intensity of light associated with information on a corresponding position on the object plane.

DESCRIPTION OF EMBODIMENTS

Technical Problem

Figure 1:
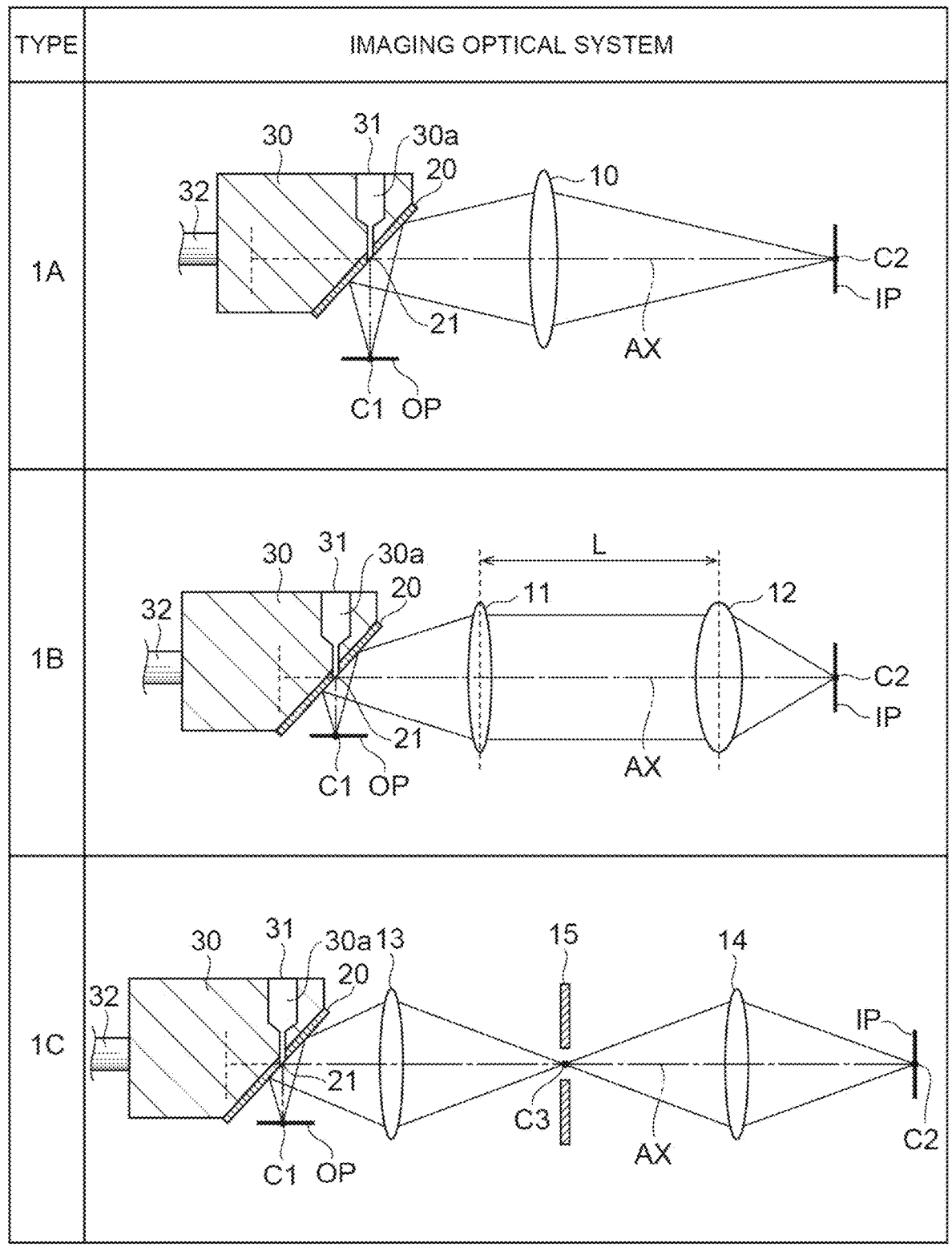
FIG. 1 is a diagram illustrating various examples of an imaging optical system applicable to a coating condition detection device according to an embodiment of the present disclosure, the imaging optical system including a reflection mirror having a flat surface.

As a result of examining the above-described conventional techniques, the inventors have found the following problems. That is, when a ratio between a coating outer diameter (an outer diameter of the coated fiber) and a glass diameter (an outer diameter of the bared fiber) is small (for example, 1.7 or less), the grayscale image formed by monitor light for detecting a degree of unevenness in thickness of the coated resin layer cannot be visually recognized or is hardly visually recognized. Further, in order to detect the degree of unevenness in thickness of the resin layer in the circumferential direction around the fiber axis from the side surface of the coated fiber, it is necessary to prepare a plurality of detection optical systems (a laser light source and a light receiving device), which makes the alignment work of the detection optical systems complicated, makes the device larger in size, and makes the device structure complicated, in addition to an increase in cost of manufacturing the device.

The present disclosure has been made to solve the above-described problems, and it is therefore an object of the present disclosure to provide a coating condition detection method, a coating condition detection device, and an optical fiber manufacturing method that allow, even when a ratio between a coating outer diameter and a glass diameter is small, a coating condition of a resin layer of a coated fiber to be detected with a simple device structure as compared with the related art.

Advantageous Effects of Invention

The coating condition detection method and the like of the present disclosure allow, when the ratio of the coating outer diameter to the glass diameter is small, the coating condition of the resin layer of the coated fiber to be detected with a simple device structure as compared with the related art.

DESCRIPTION OF EMBODIMENT OF PRESENT DISCLOSURE

First, details of the embodiment of the present disclosure will be individually listed and described.

(1) A coating condition detection method according to the embodiment of the present disclosure is a method for detecting a coating condition of resin with which an optical fiber is coated (coated fiber obtained as a result of coating a bared fiber with resin) in a circumferential direction around a fiber axis using light released from the coated fiber. Under the coating condition detection method according to one aspect, an imaging optical system is prepared, and intensity of light at each point of an image formed by imaging optical system on an imaging plane (light receiving surface) is detected with the intensity of light associated with information on a corresponding position on an object plane. Specifically, the imaging optical system thus prepared includes a reflection mirror disposed on an optical path between the imaging plane and the object plane conjugate with the imaging plane. The reflection mirror has a guide hole through which the coated fiber passes. Further, on the imaging plane side, the imaging optical system is caused to form, on the imaging plane, an image of light released from a portion of the coated fiber that has passed through the guide hole of the reflection mirror, the portion intersecting the object plane, to detect intensity of light at each position on the imaging plane with the intensity of light associated with information on a corresponding position on the object plane.

Note that the "light released from the coated fiber" is a light component released to the outside of the optical fiber after propagating in the optical fiber among light components emitted to the optical fiber during manufacturing, and examples of such a light component include UV light for curing the coating of the optical fiber.

Note that the imaging optical system may be configured to form an intermediate imaging plane on the optical path between the object plane and the imaging plane. Such a configuration allows an increase in contrast of a grayscale image formed on the imaging plane by disposing a diaphragm on the intermediate imaging plane.

The above-described configuration allows the coating condition of the resin layer around the fiber axis to be efficiently detected with a simple device structure. In other words, the above-described configuration allows the coating condition in the circumferential direction around the fiber axis to be detected without depending on a ratio between a coating outer diameter (an outer diameter of the coated fiber) and a glass diameter (an outer diameter of the bared fiber). Note that, the "coating condition of the resin" refers herein to fluctuations in thickness in the circumferential direction of the resin layer provided on the outer periphery of the bared fiber (a degree of unevenness in thickness of the resin layer or a degree of eccentricity of the bared fiber in the coated fiber), a degree of mixture of air bubbles in the resin layer, and a degree of separation along the interface between the bared fiber and the resin layer, and the like. Further, the coated fiber that is a detection target is a coated fiber obtained as a result of coating a glass fiber (bared fiber) with a resin layer, and the resin layer includes a single layer (primary coating) or a plurality of layers (continuous layers of the primary coating, the secondary coating, and the like) provided on the bared fiber during preform drawing. The resin layer also includes colored resin with which the coated fiber is coated while the coated fiber wound around the drum during preform drawing is rewound around another drum.

(2) According to one aspect of the present disclosure, a two-dimensional image visually representing the coating condition of the resin on the basis of the intensity of light detected and the information on the corresponding position may be outputted onto a monitor. This allows the condition of the cross section of the coated fiber that is a detection target to be visually confirmed.

(3) According to one aspect of the present disclosure, the two-dimensional image may include at least one of a grayscale image showing a cross section of the coated fiber that is a detection target, a light intensity distribution shown along each of two orthogonal axes on the imaging plane, the two orthogonal axes being orthogonal to each other at an intersection of an axis on the imaging plane corresponding to the fiber axis and the imaging plane, or a light intensity distribution in a circumferential direction around the axis on the imaging plane corresponding to the fiber axis. In particular, performing numerical analyses on an image once captured by an image capturing device such as a camera allows the coating condition (fluctuations in thickness in the circumferential direction of the resin layer, a degree of mixture of air bubbles in the resin layer, or a degree of separation along the interface between the bared fiber and the resin layer) to be quantitatively or dynamically determined. Further, giving detection data to a measuring instrument enables a process control (it is possible to generate control information used for controlling the operation of each unit of a manufacturing device or the like on the basis of the detection data thus given).

(4) According to one aspect of the present disclosure, the reflection mirror may include an off-axis parabolic mirror, and in this case, the off-axis parabolic mirror has a hole serving as the guide hole. When the off-axis parabolic mirror is used as the reflection mirror, the imaging optical system is disposed so as to cause the coated fiber to pass through a focal point of the off-axis parabolic mirror after passing through the hole of the off-axis parabolic mirror. The off-axis parabolic mirror reflects light from the focal point as collimated light. Therefore, the use of the off-axis parabolic mirror as the reflection mirror allows a reduction in the number of lens elements constituting the imaging optical system (simplification of the structure of the imaging optical system).

(5) According to one aspect of the present disclosure, the reflection mirror may include an ellipsoid mirror, and in this case, the ellipsoid mirror has a hole serving as the guide hole. When the ellipsoid mirror is used as the reflection mirror, the imaging optical system is disposed so as to cause the coated fiber to pass through one focal point of the ellipsoid mirror after passing through the hole of the ellipsoid mirror and to cause an other focal point of the ellipsoid mirror to be positioned on the imaging plane or an optical path between the ellipsoid mirror and the imaging plane. The ellipsoid mirror concentrates light from the one focal point on the other focal point (the two focal points are conjugate with each other). Therefore, the use of the ellipsoid mirror as the reflection mirror allows the imaging optical system to be constituted of only the ellipsoid mirror. Further, even a combination of the ellipsoid mirror and a lens can constitute an imaging optical system having a simple structure (simplification of the structure of the imaging optical system).

(6) According to one aspect of the present disclosure, the light released from the coated fiber may include resin curing light emitted to the resin in a space on a side of the reflection mirror remote from the object plane. That is, when the coating condition detection method is applied to a coated fiber manufacturing device (drawing device), disposing the above-described imaging optical system on the downstream side of a resin coating device allows a light source for resin curing to be used as a light source for coating condition detection.

(7) According to one aspect of the present disclosure, the light released from the optical fiber may include light from an external light source other than the resin curing light emitted to the optical fiber in the space on the side of the reflection mirror remote from the object plane. As described above, preparing the external light source separately from an ultraviolet light source of the resin coating device increases the degree of freedom in arrangement of the imaging optical system. Further, installing the external light source can make the grayscale image formed by the light released from the coating of the coated fiber clearer (increase the S/N ratio of the grayscale image formed on the imaging plane).

(8) A coating condition detection device according to the embodiment of the present disclosure is a device for implementing the above-described coating condition detection method, and the coating condition detection device is structured to detect the coating condition of resin with which an optical fiber is coated (coated fiber) in the circumferential direction around a fiber axis using light released from the coated fiber. Specifically, according to one aspect, the coating condition detection device includes a light receiving device and an imaging optical system. The imaging optical system includes a reflection mirror disposed on an optical path between an imaging plane to be projected onto a light receiving surface of the light receiving device and an object plane conjugate with the imaging plane. The reflection mirror having a guide hole through which the coated fiber passes. Further, the light receiving device detects intensity of light at each point on the imaging plane where an image of the light released from a portion of the coated fiber that has passed through the guide hole of the reflection mirror is formed by the imaging optical system, the portion intersecting the object plane, with the intensity of light associated with information on a corresponding position on the object plane. This configuration allows the above-described coating condition detection method to be implemented.

(9) According to one aspect of the present disclosure, the coating condition detection device may further include a controller configured to output, onto a monitor, a two-dimensional image visually representing the coating condition of the resin on the basis of the intensity of light detected by the light receiving device and the information on the corresponding position. This allows the condition of the cross section of the coated fiber that is a detection target to be visually confirmed. Further, the two-dimensional image may include at least one of a grayscale image corresponding to the cross section of the coated fiber that is a detection target, a light intensity distribution shown along each of two orthogonal axes on the imaging plane, the two orthogonal axes being orthogonal to each other at an intersection of the fiber axis and the imaging plane, or a light intensity distribution in the circumferential direction around the fiber axis. For example, performing numerical analyses on an image once captured by an image capturing device such as a camera allows the coating condition (fluctuations in thickness in the circumferential direction of the resin layer, a degree of mixture of air bubbles in the resin layer, or a degree of separation along the interface between the bared fiber and the resin layer) to be quantitatively or dynamically determined. Further, giving detection data to a measuring instrument enables a process control (it is possible to generate control information used for controlling the operation of each unit of a manufacturing device or the like on the basis of the detection data thus given).

(10) According to one aspect of the present disclosure, the reflection mirror may include an off-axis parabolic mirror, and in this case, the off-axis parabolic mirror has a hole serving as the guide hole. When the off-axis parabolic mirror is used as the reflection mirror, the imaging optical system is disposed so as to cause the coated fiber to pass through a focal point of the off-axis parabolic mirror after passing through the hole of the off-axis parabolic mirror. This can make the imaging optical system simple in structure as described above.

(11) According to one aspect of the present disclosure, the reflection mirror may include an ellipsoid mirror, and in this case, the ellipsoid mirror has a hole serving as the guide hole. When the ellipsoid mirror is used as the reflection mirror, the imaging optical system is disposed so as to cause the coated fiber to pass through one focal point of the ellipsoid mirror after passing through the hole of the ellipsoid mirror and to cause an other focal point of the ellipsoid mirror to be positioned on the imaging plane or an optical path between the ellipsoid mirror and the imaging plane. This can also make the imaging optical system simple in structure as described above.

(12) According to one aspect of the present disclosure, the coating condition detection device may include, in a space on a side of the reflection mirror remote from the object plane, a light source configured to emit, to the optical fiber including the resin, light that can propagate in the optical fiber. When the coating condition detection device is applied to the optical fiber manufacturing device, disposing the coating condition detection device on the downstream side of the resin coating device allows light from the ultraviolet light source of the resin coating device to be used as detection light (released light), for example. Further, the use of an external light source in addition to the light source (the ultraviolet light source for resin curing) of the resin coating device can effectively increase the S/N ratio of the grayscale image formed on the imaging plane.

(13) An optical fiber manufacturing method according to the embodiment of the present disclosure is a method for winding a bared fiber with the bared fiber coated with resin, the bared fiber being obtained as a result of drawing an optical fiber preform. In particular, under the optical fiber manufacturing method according to one aspect, a coating condition detection device having the above-described structure (the coating condition detection device of the present disclosure) is disposed on the downstream side of a resin coating device including a die configured to coat the bared fiber with the resin, and a resin coating condition is changed on the basis of a detection result obtained from the coating condition detection device. Note that examples of the resin coating condition include regulation of a flow rate of a flushing gas ($CO_2$ regulation), prevention of air bubbles from mixing into the resin layer (specifically, temperature control on a cooling device disposed on the upstream side of the resin coating device), and the like, in addition to a change in posture of the die (elimination of eccentricity of the bared fiber in the coated fiber).

As described above, each of the aspects listed in "Description of embodiment of present disclosure" is applicable to all remaining aspects or all combinations of the remaining aspects.

DETAILS OF EMBODIMENT OF PRESENT DISCLOSURE

Specific examples of an optical fiber coating condition detection method, an optical fiber coating condition detection device, and an optical fiber manufacturing method according to the present disclosure will be described in detail below with reference to the accompanying drawings. It should be noted that the present disclosure is not limited to such examples, and is intended to be defined by the claims and to include all modifications within the scope of the claims and their equivalents. Further, in a description of the drawings, the same components are denoted by the same reference numerals, and a redundant description will be omitted.

Figure 2:
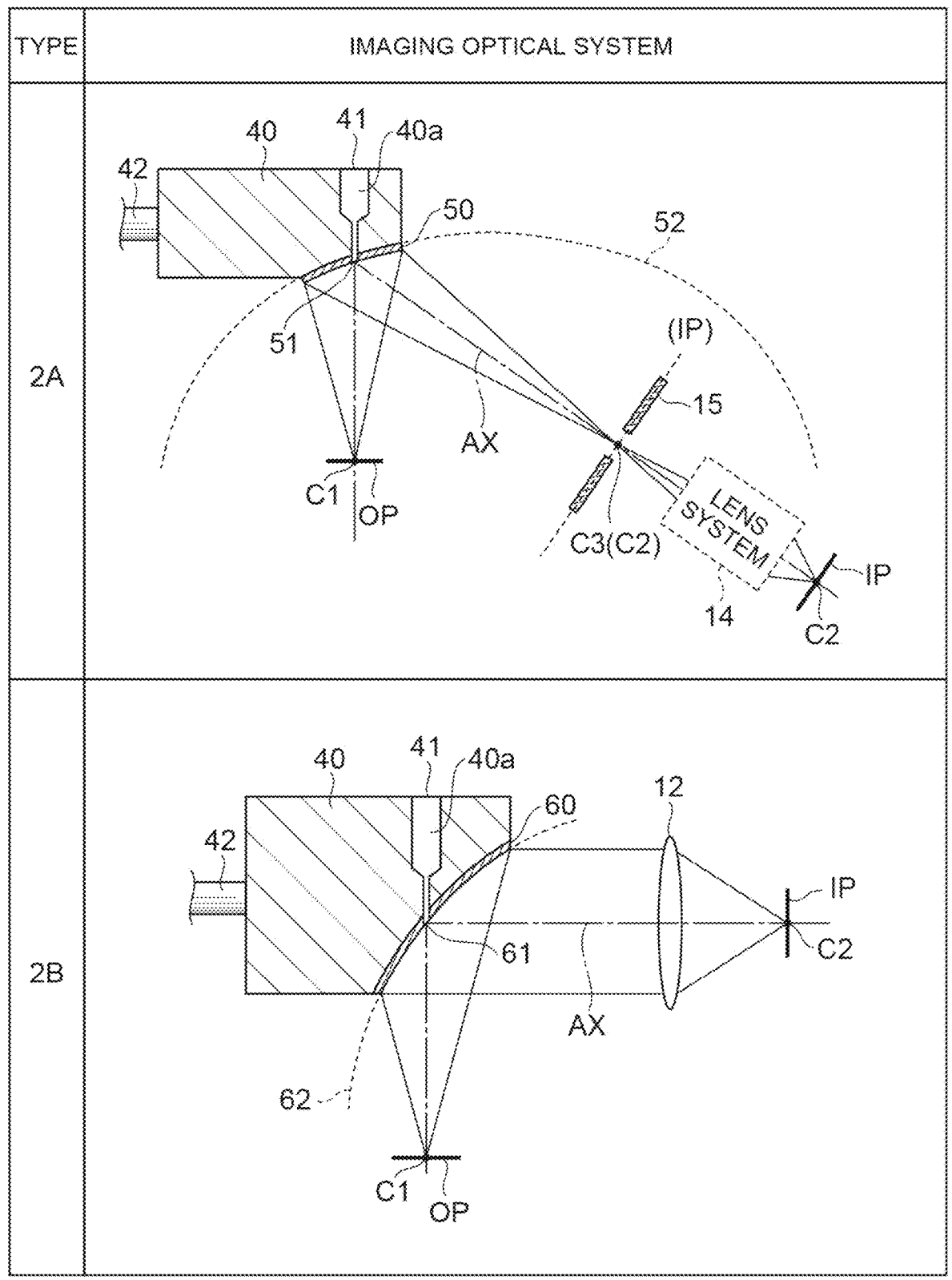
FIG. 2 is a diagram illustrating various examples of an imaging optical system applicable to the coating condition detection device according to the embodiment of the present disclosure, the imaging optical system including a reflection mirror having a curved surface.

First, a representative structure of an imaging optical system for implementing a coating condition detection method according to the embodiment of the present disclosure and a coating condition detection device according to the embodiment of the present disclosure (a device for implementing the coating condition detection method according to the embodiment of the present disclosure) will be described with reference to FIGS. 1 and 2. Note that FIG. 1 is a diagram illustrating various examples of an imaging optical system applicable to the coating condition detection method and the coating condition detection device according to the embodiment of the present disclosure, the imaging optical system including a reflection mirror having a flat surface. Note that FIG. 2 is a diagram illustrating various examples of an imaging optical system applicable to the coating condition detection method and the coating condition detection device according to the embodiment of the present disclosure, the imaging optical system including a reflection mirror having a curved surface.

An imaging optical system 1A illustrated in FIG. 1 is an imaging optical system having the simplest structure using a flat reflection mirror, and includes an imaging lens 10 and a flat reflection mirror 20. A light receiving surface of a light receiving device that receives part of light released from a coated fiber is installed at an imaging plane IP, and an object plane OP and the imaging plane IP are conjugate with each other via the imaging lens 10. That is, an intersection C1 of an optical axis AX of the imaging optical system 1A and the object plane OP and an intersection C2 of the optical axis AX and the imaging plane IP are conjugate points. The flat reflection mirror 20 is disposed on an optical path between the object plane OP and the imaging lens 10, and light released from the object plane OP is reflected off the flat reflection mirror 20 and concentrated onto the imaging plane IP. Further, the flat reflection mirror 20 is provided on one side of a guide member 30. Furthermore, the flat reflection mirror 20 and the guide member 30 have a guide hole 30a through which the coated fiber passes, and the flat reflection mirror 20 has an output-side opening 21 of the guide hole 30a. The coated fiber passes through from an input-side opening 31 of the guide hole 30a to the output-side opening 21 provided in the flat reflection mirror 20. Further, the guide member 30 is held by a support member 32 in order to fix a positional relationship between the coated fiber and the flat reflection mirror 20.

For example, when the imaging optical system 1A is disposed so as to cause the coated fiber that has passed through the guide hole 30a of the guide member 30 connecting the input-side opening 31 and the output-side opening 21 to intersect the object plane OP at the conjugate point C1, the imaging plane IP is formed at a distance from the coated fiber by a predetermined distance, and light released from a portion of the coated fiber located at the conjugate point C1 forms an image at the conjugate point C2 on the imaging plane IP. As a result, a two-dimensional grayscale image showing the cross section of the coated fiber at the conjugate point C1 is formed on the imaging plane IP.

An imaging optical system 1B illustrated in FIG. 1 includes two collimator lenses 11, 12 and the flat reflection mirror 20. Further, it is possible to adjust a length (optical path length) of an optical axis AX of the imaging optical system 1B by changing a distance L between the collimator lenses 11, 12. The position of the object plane OP is determined by a position of a focal point of the collimator lens 11, and the position of the imaging plane IP is determined by a position of a focal point of the collimator lens 12. The object plane OP and the imaging plane IP are conjugate with each other via the collimator lenses 11, 12. That is, the intersection C1 of the optical axis AX of the imaging optical system 1B and the object plane OP and the intersection C2 of the optical axis AX and the imaging plane IP are conjugate points. The flat reflection mirror 20 is disposed on the optical path between the object plane OP and the collimator lens 11, and light released from the object plane OP is reflected off the flat reflection mirror and concentrated onto the imaging plane IP. Further, as with the imaging optical system 1A, the flat reflection mirror 20 is provided on one side of the guide member 30 whose position relative to the coated fiber is fixed by the support member 32. The guide member 30 is provided with the guide hole 30a that connects the output-side opening 21 and the input-side opening 31 provided in the flat reflection mirror 20.

Also in the imaging optical system 1B, when the imaging optical system 1B is disposed so as to cause the coated fiber that has passed through the guide hole 30a of the guide member 30 connecting the input-side opening 31 and the output-side opening 21 to intersect the object plane OP at the conjugate point C1, light released from a portion of the coated fiber located at the conjugate point C1 forms an image at the conjugate point C2 on the imaging plane IP. As a result, a two-dimensional grayscale image showing the cross section of the coated fiber at the conjugate point C1 is formed on the imaging plane IP.

An imaging optical system 1C illustrated in FIG. 1 includes two imaging lenses 13, 14, the flat reflection mirror 20, and a diaphragm 15 disposed between the two imaging lenses 13, 14. In the imaging optical system 1C, the diaphragm 15 is disposed on an imaging plane formed on an optical path between the imaging lens 13 and the imaging lens 14, and the object plane OP, the plane on which the diaphragm 15 is disposed, and the imaging plane IP are conjugate with each other. That is, the intersection C1 of the optical axis AX of the imaging optical system 1C and the object plane OP, and the intersection C2 of the optical axis AX and the imaging plane IP are conjugate points. The C2 and an intersection C3 of the optical axis AX and the imaging plane on which the diaphragm 15 is disposed are conjugate points. The flat reflection mirror 20 is disposed on an optical path between the object plane OP and the imaging lens 13, and light released from the object plane OP is reflected off the flat reflection mirror 20 and concentrated onto the imaging plane IP. Further, as with the imaging optical system 1A, the flat reflection mirror 20 is provided on one side of the guide member 30 whose position relative to the coated fiber is fixed by the support member 32. The guide member 30 is provided with the guide hole 30a that connects the output-side opening 21 and the input-side opening 31 provided in the flat reflection mirror 20.

Also in the imaging optical system 1C, when the imaging optical system 1C is disposed so as to cause the coated fiber that has passed through the guide hole 30a of the guide member 30 connecting the input-side opening 31 and the output-side opening 21 to intersect the object plane OP at the conjugate point C1, light released from a portion of the coated fiber located at the conjugate point C1 forms an image at the conjugate point C2 on the imaging plane IP. As a result, a two-dimensional grayscale image showing the cross section of the coated fiber at the conjugate point C1 is formed on the imaging plane IP. Note that when the coated fiber that has passed through the flat reflection mirror 20 intersects the object plane OP at a position that is not coincident with the conjugate point C1, the position of the diaphragm 15 on the imaging plane (plane orthogonal to the optical axis AX) is adjusted.

The imaging optical system 1A to the imaging optical system 1C described above are each an imaging optical system including the flat reflection mirror 20, but the use of a special curved mirror instead of the flat reflection mirror 20 can make the imaging optical system simpler in structure. For example, an imaging optical system 2A illustrated in FIG. 2 is obtained as a result of applying a reflection mirror (hereinafter, referred to as an "ellipsoid mirror") 50 having a curved surface coincident with a part of a spheroid surface 52 to the imaging optical system 1A illustrated in FIG. 1 or the imaging optical system 1C illustrated in FIG. 1. Further, an imaging optical system 2B illustrated in FIG. 2 is obtained as a result of applying an off-axis parabolic mirror 60 having a curved surface coincident with a part of a paraboloid of revolution 62 to the imaging optical system 1B illustrated in FIG. 1.

Specifically, in the imaging optical system 2A to which the ellipsoid mirror 50 is applied instead of the flat reflection mirror 20 and the imaging lens 10 of the imaging optical system 1A illustrated in FIG. 1, the position of the object plane OP is determined by the position of one of the two focal points of the ellipsoid mirror 50 (two focal points of the spheroid), and the position of the imaging plane IP is determined by the position of the other focal point (the two focal points of the ellipsoid mirror 50 are conjugate points C1, C2). This allows the imaging optical system 2A to work in the same manner as the imaging optical system 1A even without a lens element on the optical axis AX.

Further, in the imaging optical system 2A to which the ellipsoid mirror 50 is applied instead of the flat reflection mirror 20 and the imaging lens 13 of the imaging optical system 1C illustrated in FIG. 1, the position of the object plane OP is determined by the position of one of the two focal points of the ellipsoid mirror 50, and the position of the other focal point coincides with the position of the imaging plane on which the diaphragm 15 is disposed (two focal points of the ellipsoid mirror 50 are conjugate points C1, C3). This allows the imaging optical system 2A to work in the same manner as the imaging optical system 1C with the number of lenses arranged on the optical axis AX reduced.

In the imaging optical system 2A, light released from the object plane OP is reflected off the ellipsoid mirror 50 and concentrated onto the imaging plane IP. Further, as with the imaging optical system 1A and the imaging optical system 1C, the ellipsoid mirror 50 is provided on one side of a guide member 40 whose position relative to the coated fiber is fixed by the support member 42. The guide member 40 is provided with a guide hole 40a that connects an output-side opening 51 provided in the ellipsoid mirror 50 and an input-side opening 41.

Further, in the imaging optical system 2B to which the off-axis parabolic mirror 60 is applied instead of the flat reflection mirror 20 and the collimator lens 11 of the imaging optical system 1B illustrated in FIG. 1, the position of the object plane OP is determined by the position of the focal point of the off-axis parabolic mirror 60, and the position of the imaging plane IP is determined by the position of the focal point of the collimator lens 12. In this case, the focal point of off-axis parabolic mirror 60 is conjugate with the intersection C2 of the optical axis AX and the imaging plane IP (the mirror focal point on the object plane OP is the conjugate point C1 conjugate with the intersection C2 on the imaging plane IP). Therefore, in the imaging optical system 2B, light from the focal point of the off-axis parabolic mirror 60 is collimated by the off-axis parabolic mirror 60, and an image is formed on the imaging plane IP by the collimator lens 12.

In the imaging optical system 2B, light released from the object plane OP is reflected off the off-axis parabolic mirror 60 and concentrated onto the imaging plane IP. Further, as with the imaging optical system 1A and the like, the off-axis parabolic mirror 60 is provided on one side of the guide member 40 whose position relative to the coated fiber is fixed by the support member 42. The guide member 40 is provided with the guide hole 40a that connects an output-side opening 61 provided in the off-axis parabolic mirror 60 and the input-side opening 41.

Figure 3:
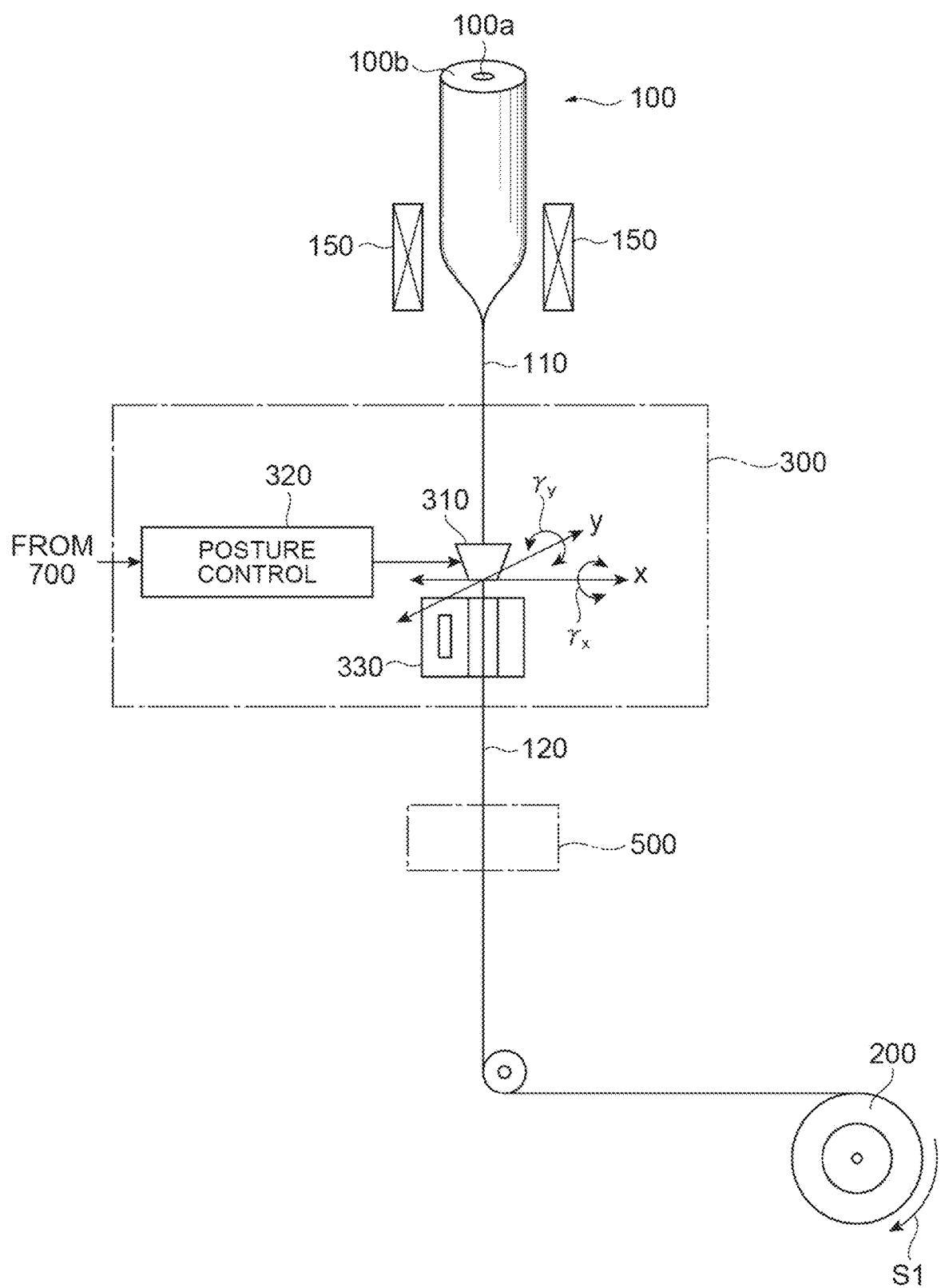
FIG. 3 is a diagram illustrating an example of an optical fiber manufacturing device (drawing device) for implementing an optical fiber manufacturing method according to the embodiment of the present disclosure.

FIG. 3 is a diagram illustrating an example of an optical fiber manufacturing device (drawing device) for implementing the optical fiber manufacturing method according to the embodiment of the present disclosure. Specifically, the optical fiber manufacturing device illustrated FIG. 3 includes a heater 150 for heating one end of an optical fiber preform 100, a drum 200 for winding a coated fiber 120 obtained as a result of coating, with resin, a bared fiber (glass fiber) 110 obtained as a result of drawing the optical fiber preform 100, a resin coating device 300, and a coating condition detection device 500. The optical fiber preform 100 includes a core portion 100a and a cladding portion 100b. Note that the core portion 100a is a region to be a core 110a of the bared fiber 110 obtained as a result of drawing the preform, and the cladding portion 100b is a region that surrounds the core portion 100a and is to be a cladding 110b of the bared fiber 110. When the drum 200 rotates in a direction indicated by an arrow S1, the coated fiber 120 is wound around the drum 200. The resin coating device 300 is a device that is disposed between the optical fiber preform 100 and the drum 200 and that coats the outer peripheral surface of the running bared fiber 110 with resin. The bared fiber 110 is coated with resin by the resin coating device 300 to become the coated fiber 120. The resin coating device 300 includes a die 310 for coating the outer peripheral surface of the bared fiber 110 with an ultraviolet-curable resin, a posture control device 320 for adjusting the posture of the die 310, and an ultraviolet irradiation device 330. The coating condition detection device 500 detects a two-dimensional grayscale image showing the cross section of the coated fiber 120 using ultraviolet rays emitted from the ultraviolet irradiation device 330 of the resin coating device 300 located on the upstream side of the coating condition detection device 500.

Note that, although not illustrated, a cooling device for forcibly cooling the bared fiber 110 is disposed between the optical fiber preform 100 and the resin coating device 300. Although FIG. 3 illustrates an example where the single-stage resin coating device 300 is provided, a plurality of stages of resin coating devices may be arranged in a longitudinal direction of the coated fiber 120 to be wound around the drum. Further, the resin used in the resin coating device 300 need not necessarily be the ultraviolet-curable resin.

Figure 4:
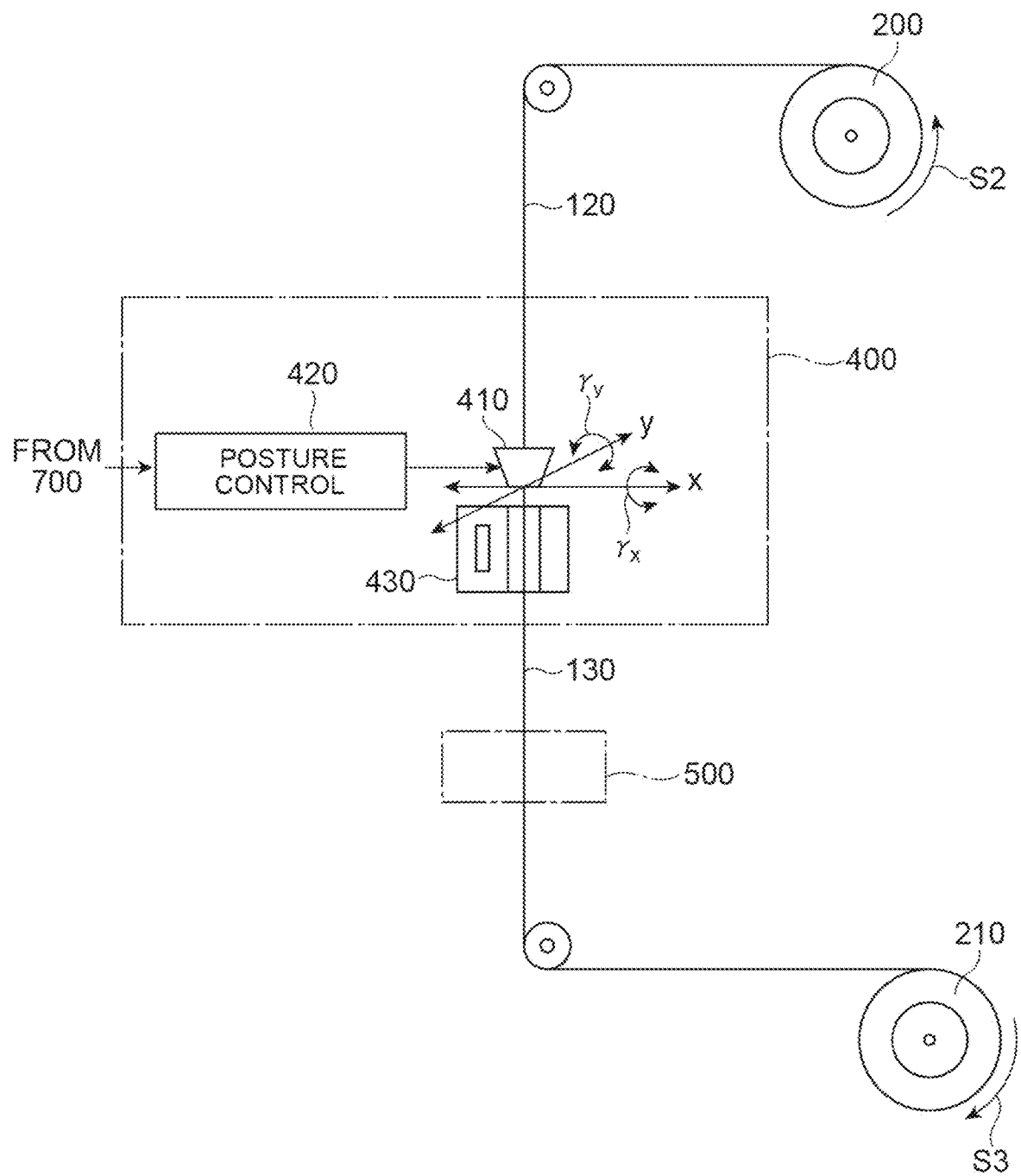
FIG. 4 is a diagram illustrating an example applied to a resin coating device configured to further coat, with resin, an outer peripheral surface of a coated fiber obtained after a preform is drawn.

FIG. 4 is a diagram illustrating an example applied to a resin coating device configured to further coat, with resin (for example, colored resin), the outer peripheral surface of the coated fiber obtained after the preform is drawn. The example illustrated in FIG. 4 is a device that rewinds a coated fiber 120 from the drum (drum around which the coated fiber 120 manufactured by the optical fiber manufacturing device illustrated in FIG. 3 is wound) 200 around a drum 210 while coloring the coated fiber. A resin coating device 400 coats, with the colored resin, the outer peripheral surface of the coated fiber 120 to be rewound around the drum 210 rotating in a direction indicated by an arrow S3 from the drum 200 rotating in a direction indicated by an arrow S2. The coating condition detection device of the present disclosure is disposed on the downstream side of the resin coating device 400.

The resin coating device 400 illustrated in FIG. 4 is the same in structure as the resin coating device 300 illustrated in FIG. 3, and a colored coated fiber 130 is obtained as a result of coating the coated fiber 120 with the colored resin by the resin coating device 400. That is, the resin coating device 400 includes a die 410 for coating the outer peripheral surface of the coated fiber 120 with an ultraviolet-curable resin (colored resin), a posture control device 420 for adjusting the posture of the die 410, and an ultraviolet irradiation device 430. Further, the coating condition detection device 500 illustrated in FIG. 4 also detects a two-dimensional grayscale image showing the cross section of the colored coated fiber 130 using ultraviolet rays emitted from the ultraviolet irradiation device 430 of the resin coating device 400 located on the upstream side of the coating condition detection device 500.

Figure 5:
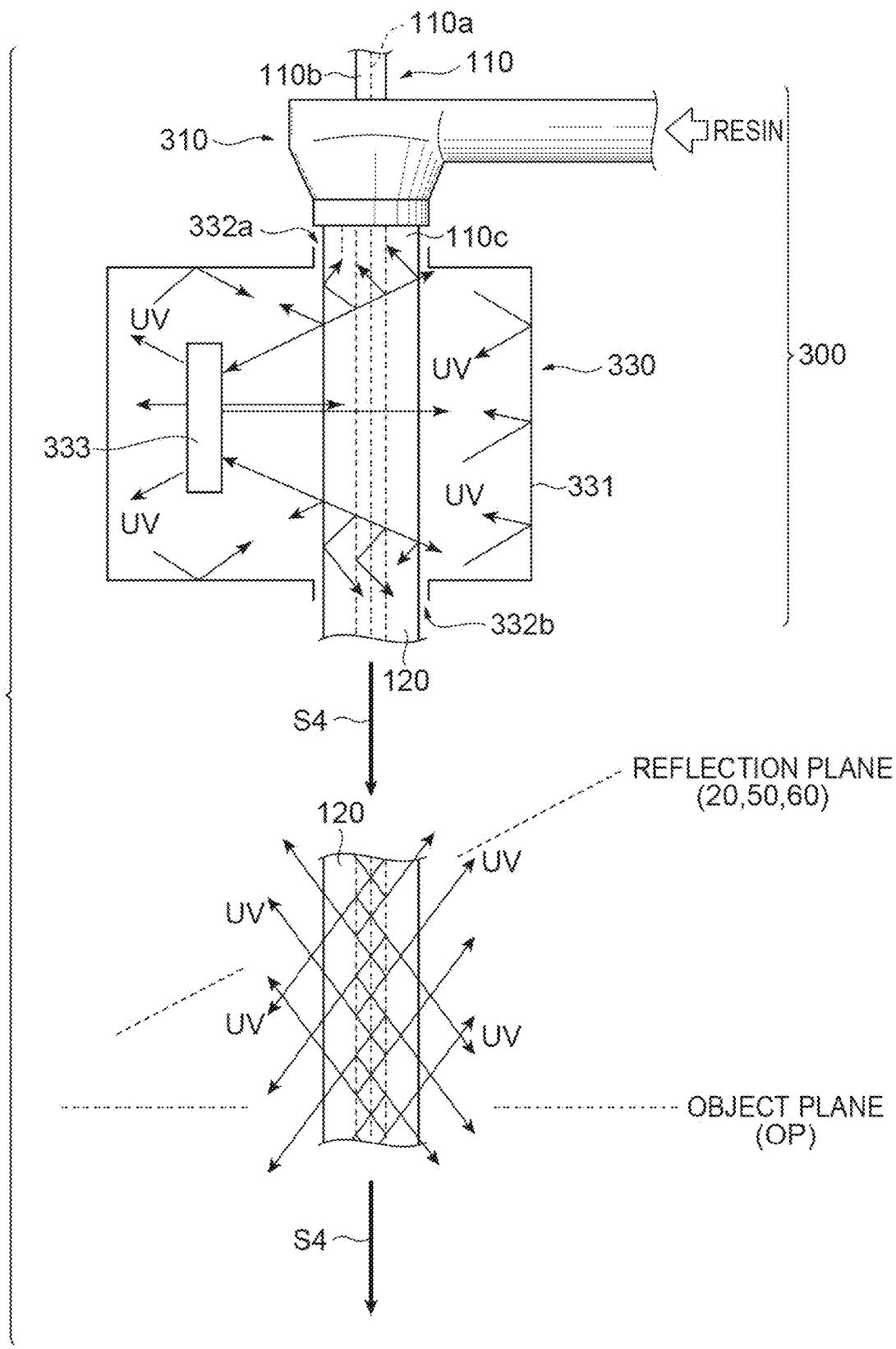
FIG. 5 is a diagram for describing a mechanism of how light is released from a drawn optical fiber.

FIG. 5 is a diagram for describing a mechanism of allowing the coating condition detection device 500 of the present disclosure to work on the downstream side of the resin coating device 300 or on the downstream side of the resin coating device 400, that is, a mechanism of how light is released from the coated fiber as illustrated in FIGS. 3 and 4. Although FIG. 5 illustrates an internal structure of the resin coating device 300 of the optical fiber manufacturing device illustrated in FIG. 3, the resin coating device 400 illustrated in FIG. 4 also allows the coated fiber to release ultraviolet rays by the same mechanism.

The bared fiber 110 obtained after the preform is drawn includes core 110a and cladding 110b provided on the outer peripheral surface of the core 110a. When the bared fiber 110 moves in a direction indicated by an arrow S4 (in FIG. 3, a direction from the optical fiber preform 100 toward the drum 200), the bared fiber 110 passes through the resin coating device 300. First, the bared fiber 110 that has entered the resin coating device 300 passes through the die 310 into which the resin (ultraviolet-curable resin) is introduced so as to have its outer peripheral surface coated with resin 110c. Subsequently, the bared fiber 110 having the resin 110c passes through the ultraviolet irradiation device 330. The ultraviolet irradiation device 330 includes a housing 331 in which an ultraviolet light source 333 is disposed. The housing 331 has an input-side opening 332a and an output-side opening 332b provided for introducing the bared fiber 110 having the resin 110c. The bared fiber 110 having the resin 110c is irradiated with ultraviolet rays UV outputted from the ultraviolet light source 333 while moving from the input-side opening 332a to the output-side opening 332b. Note that the ultraviolet rays UV are partially reflected off the bared fiber 110 having the resin 110c, but partially enter the bared fiber 110 and propagate in any direction (scattered light) in the bared fiber 110 having the resin 110c. As described above, the coated fiber 120 is obtained as a result of irradiating the resin 110c with the ultraviolet rays UV.

The ultraviolet rays UV emitted in the housing 331 are confined within the coated fiber 120 (after the resin 110c is cured) coining out from the output-side opening 332b of the housing 331 in the direction indicated by the arrow S4. Therefore, the ultraviolet rays UV are released from the surface of the coated fiber 120 that has moved to the downstream side of the resin coating device 300. FIG. 5 illustrates a positional relation between a portion from which the ultraviolet rays UV are released, and the object plane OP and the reflection plane (the flat reflection mirror 20, the ellipsoid mirror 50, and off-axis parabolic mirror 60).

As described above, with a light source such as the ultraviolet rays UV having a wavelength that can pass through the coated fiber 120 already installed on the upstream side of the coating condition detection device 500 of the present disclosure, the coating condition detection device 500 can detect, via the reflection plane, light (the ultraviolet rays UV in the example illustrated in FIG. 5) released from the portion of the coated fiber 120 that has passed through the reflection plane, the portion intersecting the object plane OP.

Figure 6:
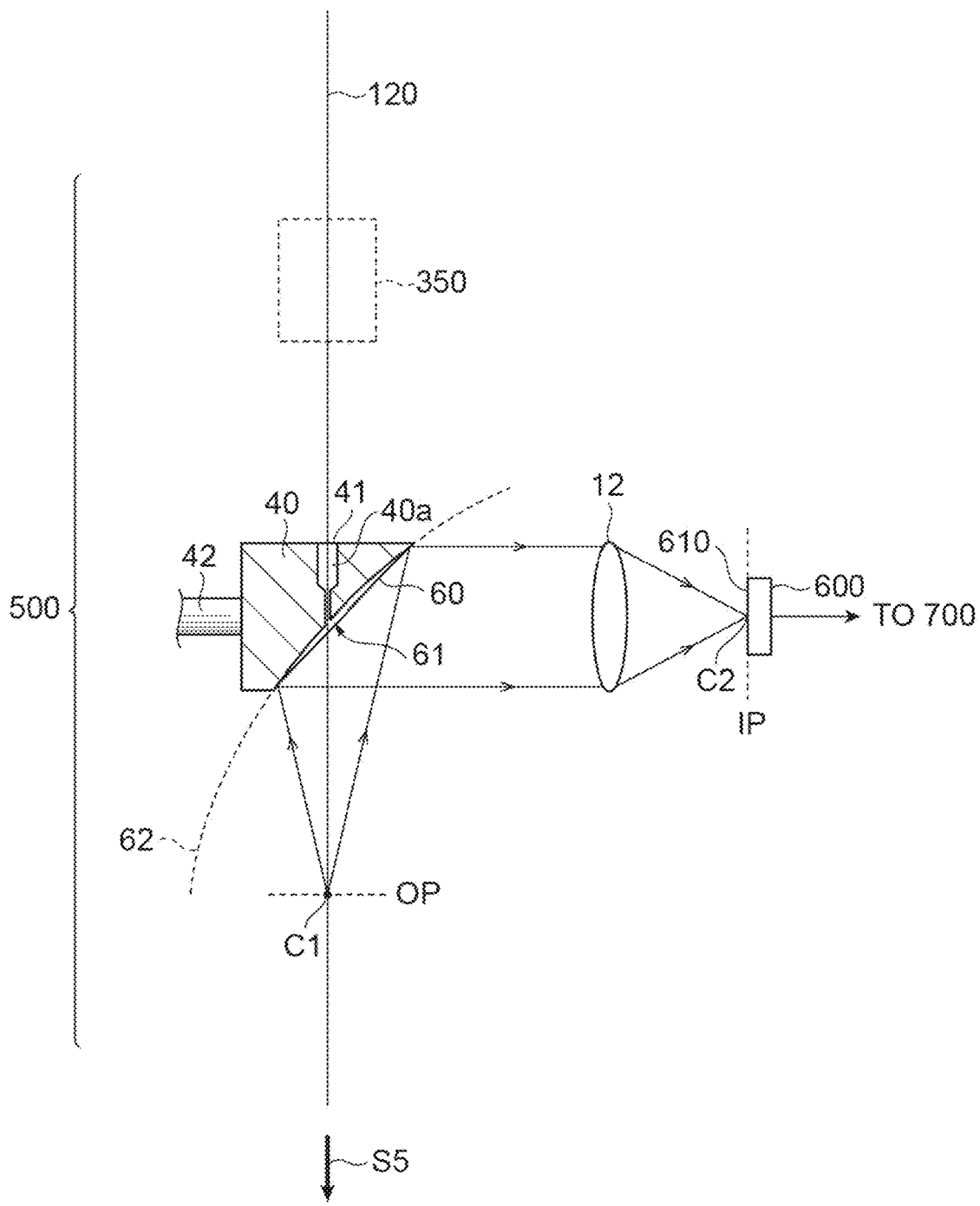
FIG. 6 is a diagram illustrating an example where a coating condition detector to which an imaging optical system 2B illustrated in FIG. 2 is applied is applied to the optical fiber manufacturing device illustrated in FIG. 3.

FIG. 6 is a diagram illustrating a specific example where a coating condition detector (the coating condition detection device 500 of the present disclosure) to which the imaging optical system 2B illustrated in FIG. 2 is applied is applied to the optical fiber manufacturing device illustrated in FIG. 3. Note that an imaging optical system other than the imaging optical system 2B illustrated in FIG. 2 may be applied.

As described with reference to FIG. 5, the configuration where the coating condition detection device 500 of the present disclosure is disposed on the downstream side of the resin coating device 300 (or the resin coating device 400) eliminates the need of preparing an external light source, but a configuration where the resin coating device 300 located on the upstream side and the coating condition detection device 500 located on the downstream side are at a distance from each other may be unable to detect a sufficient amount of released light. In such a case, as illustrated in FIG. 6, an external light source 350 that emits light having a wavelength that can pass through the coated fiber 120 may be provided near the guide member 40 having the off-axis parabolic mirror 60 provided on one side of the guide member 40.

As illustrated in FIG. 6, the off-axis parabolic mirror 60 is provided on the one side of guide member 40, and the guide member 40 is provided with the guide hole 40a that connects the output-side opening 61 provided in the off-axis parabolic mirror 60 and the input-side opening 41. The coated fiber 120 having the resin 110c is wound around the drum 200 after passing through the guide hole 40a in a direction indicated by an arrow S5. The support member 42 fixes the position of the guide member 40 relative to the coated fiber 120 so as to cause the coated fiber 120 that has passed through the guide hole 40a to pass through the focal point of the off-axis parabolic mirror 60. Note that the off-axis parabolic mirror 60 coincides with a part of the paraboloid of revolution 62, so that the focal point of the off-axis parabolic mirror 60 is located on the object plane OP. Further, this focal point becomes the conjugate point C1 conjugate with the intersection C2 of the optical axis AX and the imaging plane IP (which coincides with a light receiving surface 610 of a light receiving device 600 on the optical axis AX). Here, "coincides with the light receiving surface" does not necessarily mean an exact coincidence, and a slight difference of about 0.1 μm is allowed.

Light released from a portion of the coated fiber 120 that has passed through the output-side opening 61 of the off-axis parabolic mirror 60 located near the focal point of the off-axis parabolic mirror 60 (the position where the object plane OP and the coated fiber 120 intersect each other) is partially collimated by and reflected off the off-axis parabolic mirror 60. The collimated reflected light travels from the off-axis parabolic mirror 60 toward the collimator lens 12, and is concentrated by the collimator lens 12 onto the conjugate point C2 on the imaging plane IP. The coating condition detection device 500 includes a controller 700, and the controller 700 controls a rendering unit 720 in order to output, onto a monitor, a two-dimensional image visually representing the coating condition of the resin 110c of the coated fiber 120 on the basis of intensity of light detected by the light receiving device 600 and information on a corresponding position (see FIG. 7).

Figure 7:
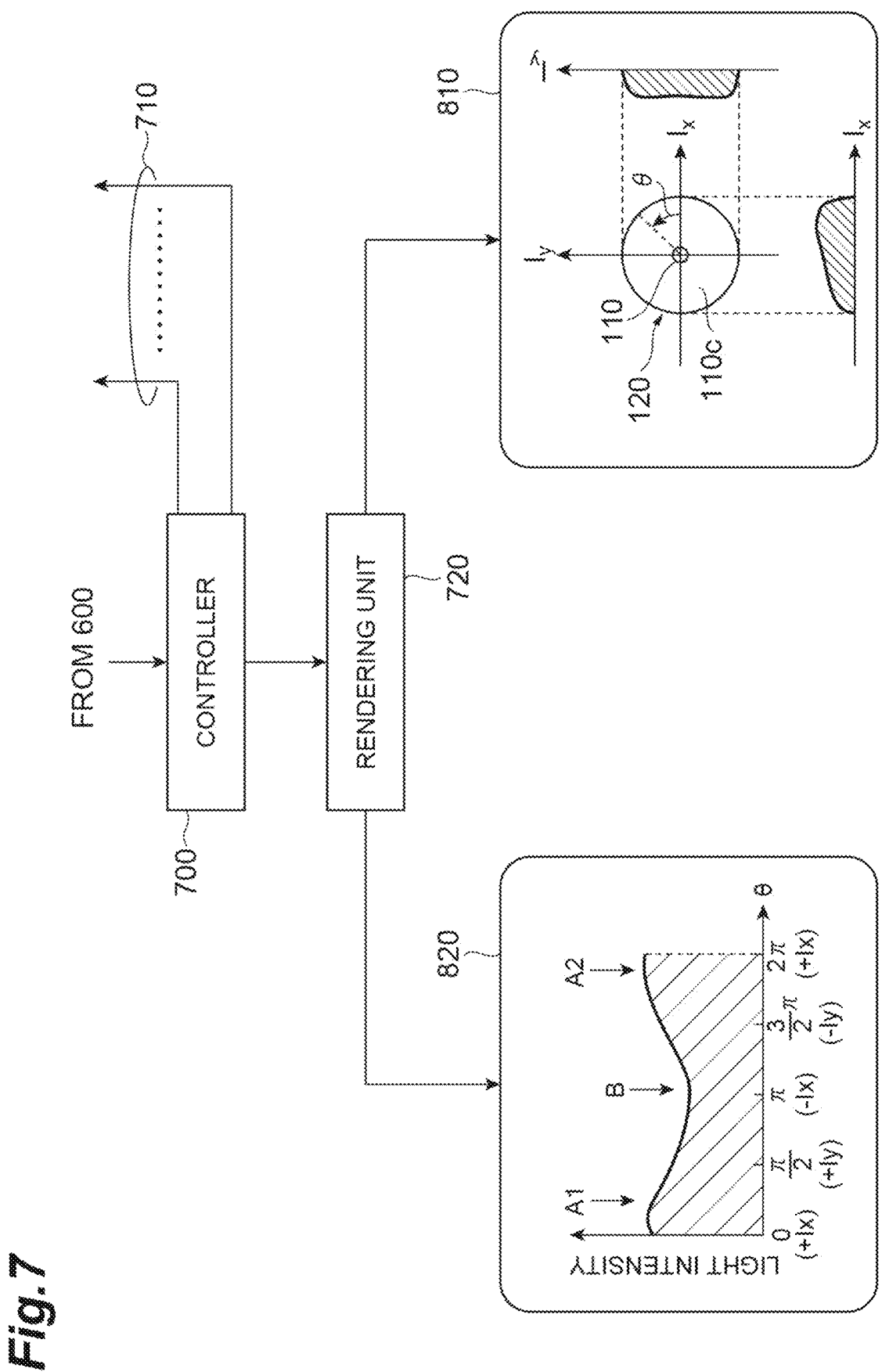
FIG. 7 is a diagram for describing an example of control operation of a controller (data processor) of a coating condition detection device according to the embodiment of the present disclosure.

Specifically, as illustrated in FIG. 7, the rendering unit 720 generates, from the grayscale image showing the cross section of the coated fiber 120 that is a detection target, a monitor screen 810 representing two-dimensionally a light intensity distribution shown on each of two orthogonal axes Ix, Iy on the imaging plane IP, the orthogonal axes Ix, Iy being orthogonal to each other at the intersection of the axis on the imaging plane IP corresponding to the fiber axis and the imaging plane IP. The rendering unit 720 can also generate a monitor screen 820 representing two-dimensionally a light intensity distribution in a circumferential direction around the axis on the imaging plane IP corresponding to the fiber axis, and generates at least one of the monitor screens 810, 820.

The controller 700 can perform various types of control in addition to rendering control (generation of the two-dimensional image visually representing the coating condition of the resin 110c of the coated fiber 120) on the rendering unit 720. For example, performing numerical analyses on an image once captured by an image capturing device such as a camera allows the coating condition of the resin 110c to be quantitatively or dynamically determined. Note that examples of a detectable coating condition of the resin 110c include a degree of unevenness in thickness of the resin (resin layer) 110c (a degree of eccentricity of the bared fiber 110 in the coated fiber 120), a degree of mixture of air bubbles in the resin 110c, a degree of separation along the interface between the bared fiber 110 and the resin 110c, and the like. Further, giving detection data to a measuring instrument enables a process control. That is, it is possible to generate a control signal (control information) 710 used for controlling the operation of each unit of the manufacturing device or the like on the basis of the detection data thus given to change the resin coating condition.

Note that, in order to change the resin coating condition, for example, the controller 700 outputs the control signal 710 to the posture control device 320 (or the posture control device 420 illustrated in FIG. 4) to change the posture of the die 310 illustrated in FIG. 3 and the like. Specifically, the posture control performed by the controller 700 on the resin coating device 300 includes (1) moving the die 310 along a plane orthogonal to the travel direction of the coated fiber 120 (an x-y plane defined by the x axis and the y axis orthogonal to each other), (2) tilting the die 310 in a direction indicated by an arrow $\gamma_x$ about the x axis, (3) tilting the die 310 in a direction indicated by an arrow $\gamma_y$ about the y axis, and the like. Note that such a posture control is performed on the resin coating device 400 illustrated in FIG. 4 in the same manner.

In addition to the posture control, the controller 700 can further regulate a flow rate of a flushing gas (for example, $CO_2$ gas) applied to an inlet for the bared fiber provided in the resin coating device 300 to prevent air bubbles from mixing into the resin 110c. The controller 700 can further output the control signal 710 used for changing a temperature to the cooling device disposed on the upstream side of the resin coating device 300 to prevent air bubbles from mixing into the resin 110c.

REFERENCE SIGNS LIST 1A, 1B, 1C, 2A, 2B imaging optical system
10, 13, 14 imaging lens
11, 12 collimator lens
15 diaphragm
20 flat reflection mirror
21, 51, 61, 332b output-side opening
30, 40 guide member
30a, 40a guide hole
31, 41, 332a input-side opening
32, 42 support member
50 ellipsoid mirror
52 spheroid surface
60 off-axis parabolic mirror
62 paraboloid of revolution
100 optical fiber preform
100a core portion
100b cladding portion
110 bared fiber
110a core
110b cladding
110c resin
120 coated fiber
130 colored coated fiber
150 heater
200, 210 drum
300, 400 resin coating device
310, 410 die
320, 420 posture control device
330, 430 ultraviolet irradiation device
331 housing
333 ultraviolet light source
500 coating condition detection device
600 light receiving device
610 light receiving surface
700 controller
710 control signal
720 rendering unit
810, 820 monitor screen
OP object plane
IP imaging plane
AX optical axis
UV ultraviolet ray
C1, C2, C3 conjugate point
S1, S2, S3, S4, S5 arrow (direction)

The invention claimed is:
1. An optical fiber manufacturing method for winding a bared fiber with the bared fiber coated with resin, the bared fiber being obtained as a result of drawing an optical fiber preform, the optical fiber manufacturing method comprising:
(1) disposing a coating condition detection device on a downstream side of a resin coating device including a die configured to coat the bared fiber with the resin, the coating condition detection device that detects a coating condition of resin with which an optical fiber is coated in a circumferential direction around a fiber axis using light released from the optical fiber, and comprises:

a light receiving device configured to receive part of the light released; and an imaging optical system including a reflection mirror disposed on an optical path between an imaging plane to be projected onto a light receiving surface of the light receiving device and an object plane conjugate with the imaging plane, the reflection mirror having a guide hole through which the optical fiber passes, wherein the light receiving device detects intensity of light at each point on the imaging plane where an image of the light released from a portion of the optical fiber that has passed through the guide hole of the reflection mirror is formed, the portion intersecting the object plane, with the intensity of light associated with information on a corresponding position on the object plane; and (2) changing a resin coating condition on the basis of a detection result obtained from the coating condition detection device.

2. The optical fiber manufacturing method according to claim 1, wherein the coating condition detection device further comprising a controller configured to output, onto a monitor, a two-dimensional image visually representing the coating condition of the resin on the basis of the intensity of light detected by the light receiving device and the information on the corresponding position.

3. The optical fiber manufacturing method according to claim 1, wherein the reflection mirror includes an off-axis parabolic mirror having a hole serving as the guide hole, and the imaging optical system is disposed so as to cause the optical fiber to pass through a focal point of the off-axis parabolic mirror after passing through the hole of the off-axis parabolic mirror.

4. The optical fiber manufacturing method according to claim 1, wherein the reflection mirror includes an ellipsoid mirror having a hole serving as the guide hole, and the imaging optical system is disposed so as to cause the optical fiber to pass through one focal point of the ellipsoid mirror after passing through the hole of the ellipsoid mirror and to cause an other focal point of the ellipsoid mirror to be positioned on the imaging plane or an optical path between the ellipsoid mirror and the imaging plane.

5. The optical fiber manufacturing method according to claim 1, wherein the coating condition detection device further comprises, in a space on a side of the reflection mirror remote from the object plane, a light source configured to emit, to the optical fiber including the resin, light that can propagate in the optical fiber.

* * * * *